(12) United States Patent
Clark

(10) Patent No.: US 10,365,185 B2
(45) Date of Patent: Jul. 30, 2019

(54) VEHICLE SUSPENSION SYSTEM BRACKET POCKET DIMENSIONAL VERIFIER TOOLS AND METHODS OF USE

(71) Applicant: Toyota Motor Engineering & Manufacturing North America, Inc., Erlanger, KY (US)

(72) Inventor: Christopher T. Clark, San Antonio, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 368 days.

(21) Appl. No.: 15/151,969

(22) Filed: May 11, 2016

(65) Prior Publication Data

US 2017/0328813 A1 Nov. 16, 2017

(51) Int. Cl.
*G01B 5/14* (2006.01)
*G01B 21/16* (2006.01)
*G01M 17/04* (2006.01)

(52) U.S. Cl.
CPC .................... *G01M 17/04* (2013.01)

(58) Field of Classification Search
CPC ............... G01B 5/0025; G01B 5/143
USPC ............ 33/608, 520, 288, 645, 613
See application file for complete search history.

(56) References Cited

U.S. PATENT DOCUMENTS

| | | | | |
|---|---|---|---|---|
| 1,560,539 A | * | 11/1925 | Cooper ............... | G09F 3/00 33/1 R |
| 2,000,866 A | * | 5/1935 | Smith ............... | G01B 5/0025 33/193 |
| RE24,224 E | * | 9/1956 | Sorensen ............ | G01B 3/20 33/520 |
| 3,810,313 A | * | 5/1974 | Hicks ............... | G01B 5/0025 33/193 |
| 4,006,532 A | * | 2/1977 | Hallman ............ | G01B 5/24 33/193 |
| 4,285,136 A | * | 8/1981 | Ragan ............... | G01B 5/255 248/205.1 |
| 4,319,402 A | * | 3/1982 | Martin ............... | G01B 5/207 33/392 |

(Continued)

OTHER PUBLICATIONS

Faro offers the world's best-selling measurement arm; http://www.fara.com/products/metrology/faroarm-measuring-arm/overview;.

*Primary Examiner* — Leslie J Evanisko
*Assistant Examiner* — Ruben C Parco, Jr.
(74) *Attorney, Agent, or Firm* — Dinsmore & Shohl LLP

(57) ABSTRACT

Methods to use a tool for dimensional verification of a vehicle frame suspension system bracket pocket having first and second cam slots, the tool including a first sub-assembly configured for insertion through and registration of the first cam slot; a second sub-assembly configured for insertion through and registration of the second cam slot; and an intermediate sub-assembly disposed between and attachable to the first and second sub-assemblies via a shaft, the intermediate sub-assembly including an extension rod receiving feature defining at least one extension rod receiving aperture; wherein the sub-assemblies lock against the bracket walls to define a horizontal center axis and are adjustable to determine and register a center point along an intersecting vertical center axis between the first and second cam slots that is alignable with the at least one extension rod receiving aperture.

19 Claims, 9 Drawing Sheets

(56) References Cited

U.S. PATENT DOCUMENTS

| | | |
|---|---|---|
| 6,519,860 B1 | 2/2003 | Bieg et al. |
| 6,973,734 B2 | 12/2005 | Raab et al. |
| 7,784,194 B2 | 8/2010 | Raab et al. |
| 7,874,078 B2 | 1/2011 | Harrill et al. |
| 8,327,555 B2 | 12/2012 | Champ |
| 8,650,767 B2 | 2/2014 | Matsumiya et al. |

* cited by examiner

VEHICLE SUSPENSION SYSTEM BRACKET POCKET DIMENSIONAL VERIFIER TOOLS AND METHODS OF USE

TECHNICAL FIELD

The present specification generally relates to bracket pocket dimensional verifier tools, or jigs, for vehicle suspension systems to verify bracket pocket dimensions on a vehicle frame and, more specifically, to bracket pocket dimensional verifier tools for vehicle suspension systems to verify center points of the bracket pockets on the vehicle frame in relation to other bracket pockets, and methods of use of such tools.

BACKGROUND

Vehicle designers typically plan installation of bracket pockets of a suspension system to have specified dimensions and be placed at specific locations. Examples of such bracket pockets include lower control arm bracket pockets on a frame of a vehicle. Once the frame is manufactured, quality checks may be undertaken to ensure the bracket pockets are located according to the specified dimensions on the vehicle frame. Such quality checks, however, typically involve use of automated systems such as coordinate measurement machines (CMM) that make extensive three-dimensional coordinate measurements of features of a vehicle frame and sub-assemblies. Such CMM measurements may be computationally and monetarily costly and may take hours to verify certain critical dimensions of a vehicle frame, such as placement of lower control arm bracket pockets on the frame, for example.

Accordingly, a need exists for alternative bracket pocket dimensional verifier tools for vehicle suspension systems and methods of use of such dimensional verifier tools.

SUMMARY

In one embodiment, a bracket pocket dimensional verifier tool for dimensional verification of a first lower control arm bracket pocket of a vehicle frame of a vehicle suspension system may include a first end exterior sub-assembly configured for insertion through a first cam slot of the first lower control arm bracket pocket and adjustable to lock to a first bracket wall defining the first cam slot, a second end exterior sub-assembly configured for insertion through a second cam slot of the first lower control arm bracket pocket and adjustable to lock to a second bracket wall defining the second cam slot, and an intermediate sub-assembly disposed between the first and second end exterior sub-assemblies and attachable to the first and second end exterior sub-assemblies via a shaft. The intermediate sub-assembly may include an extension rod receiving feature defining at least one extension rod receiving aperture. The first end exterior sub-assembly, the second end exterior sub-assembly, and the intermediate sub-assembly may lock against the first and second bracket walls to define a horizontal center axis and may be adjustable to determine a center point along an intersecting vertical center axis between the first and second cam slots of the first lower control arm bracket pocket that is alignable with the at least one extension rod receiving aperture.

In another embodiment, a method for assembling a first tool assembly of a set of tool assemblies within a first lower control arm bracket pocket of a set of lower control arm bracket pockets of a frame of a vehicle suspension system to determine a center point between a pair of first and second cam slots respectively defined by opposing first and second bracket walls of the first lower control arm bracket pocket may include providing the first tool assembly comprising a first end exterior sub-assembly, a second end exterior sub-assembly, and an intermediate sub-assembly. The method may further include attaching the second end exterior sub-assembly to the second bracket wall through insertion of the second end exterior sub-assembly through the second cam slot, joining the first end exterior sub-assembly and the intermediate sub-assembly, attaching the first end exterior sub-assembly to the first bracket wall through insertion of the first end exterior sub-assembly through the first cam slot, and attaching the intermediate sub-assembly to the second end exterior sub-assembly to determine and register the center point between the pair of first and second cam slots.

In another embodiment, a method for dimensional verification of a set of four lower control arm bracket pockets on a frame of a vehicle may include placing a tool assembly of a set of tool assemblies within each of the set of four lower control arm bracket pockets, wherein each tool assembly may respectively determines a center point between a pair of cam slots in each of the set of four lower control arm bracket pockets, inserting an extension rod into an aperture of a feature of each tool assembly that is aligned with a determined vertical axis intersecting the center point and faces in a downward direction, and measuring a set of dimensions between extension rods extending from the set of four lower control arm bracket pockets. A first lower control arm bracket pocket of the set of four lower control arm bracket pockets and a fourth lower control arm bracket pocket of the set of four lower control arm bracket pockets may be disposed on a first side member of the frame, the first lower control arm bracket pocket being disposed in front of the fourth lower control arm bracket pocket. A second lower control arm bracket pocket of the set of four lower control arm bracket pockets and a third lower control arm bracket pocket of the set of four lower control arm bracket pockets may be disposed on a second side member of the frame that is laterally spaced from the first side member, the second lower control arm bracket pocket being disposed in front of the third lower control arm bracket pocket. The second lower control arm bracket pocket may be disposed opposite the first lower control arm bracket pocket, and the third lower control arm bracket pocket may be disposed opposite the fourth lower control arm bracket pocket.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
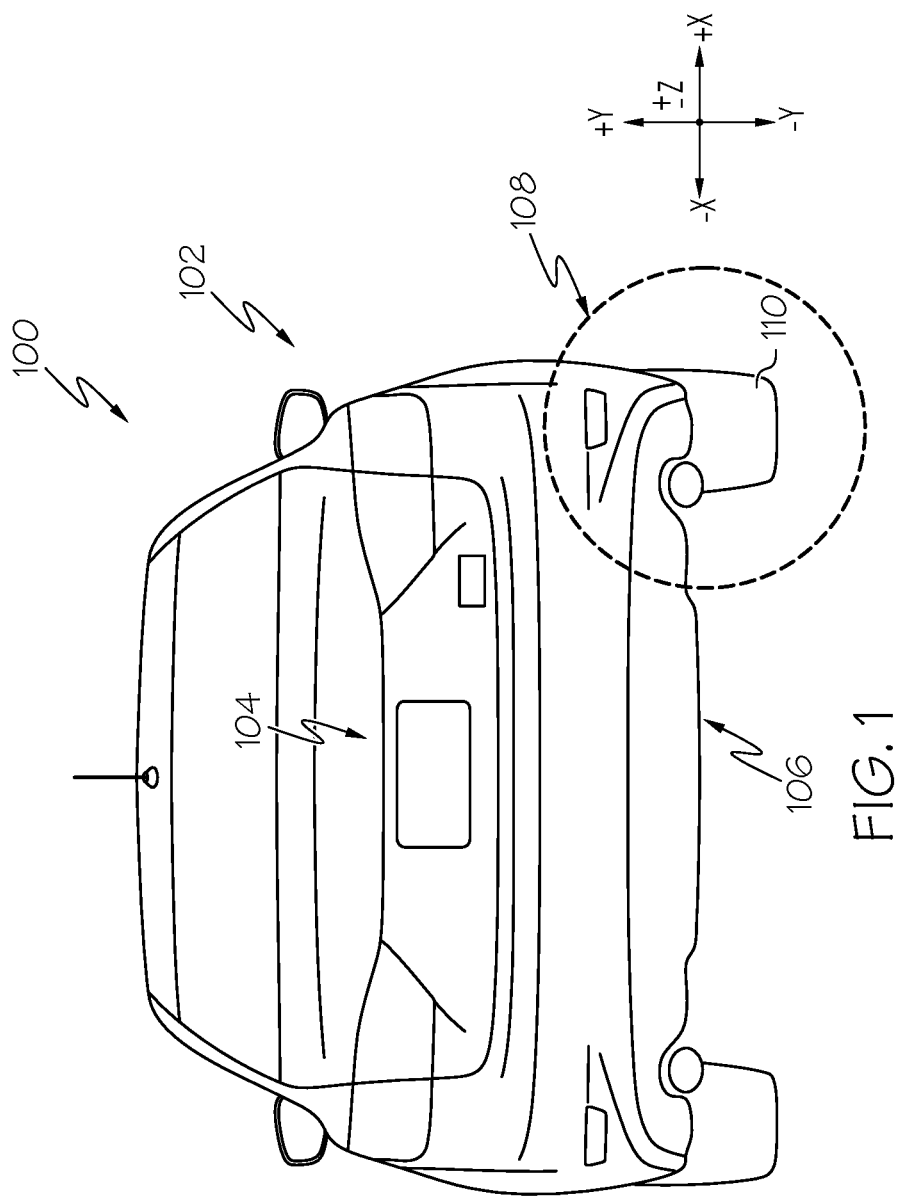
FIG. 1 schematically illustrates a rear end view of a vehicle, according to one or more embodiments shown and described herein.
Figure 2:
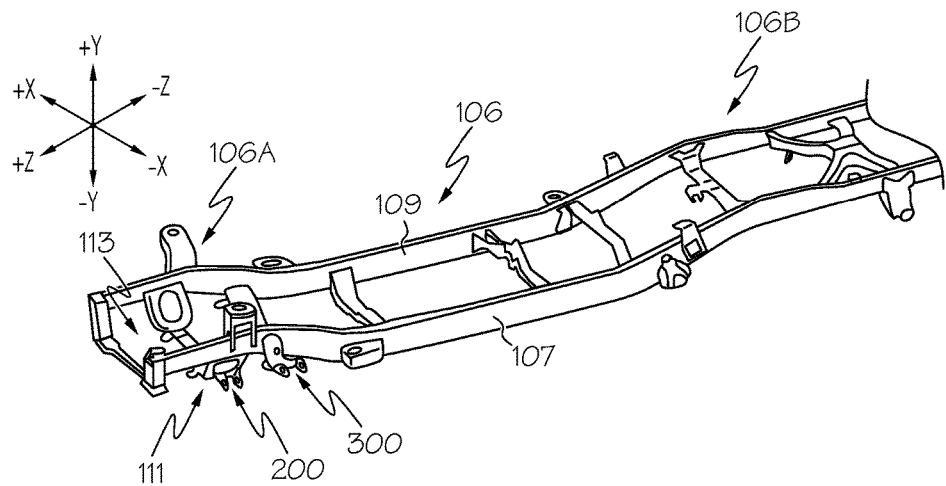
FIG. 2 schematically illustrates a perspective view of a frame of the vehicle of FIG. 1, according to one or more embodiments shown and described herein.

Bracket pocket dimensional verifier tools for vehicle suspension systems as described herein are able to manually verify center points of lower control arm bracket pockets on a vehicle frame in relation to other lower control arm bracket pockets. These tools may verify such center points in a manner that does not require potentially expensive, computational measurement through CMM operations, for example, and are able to acquire measurements in a much shorter timeframe than through use of such CMM operations. For example, the methods described herein may provide measurements in less than an hour, resulting in a reduced loss of work production time as compared to the multiple hours usually required to obtain measurements during CMM operations. Further, the manual tools described herein are able to be placed within bracket pockets to register the center points of such bracket pockets. The manual tools may further measure dimensions between the registered center points of a set of bracket points to verify correct dimensional placement of the set of bracket pockets on the vehicle frame. Reference will now be made in detail to embodiments of bracket pocket dimensional verifier tools for vehicle suspension systems, examples of which are illustrated in the accompanying drawings. Whenever possible, the same reference numerals will be used throughout the drawings to refer to the same or like parts.

Figure 8:
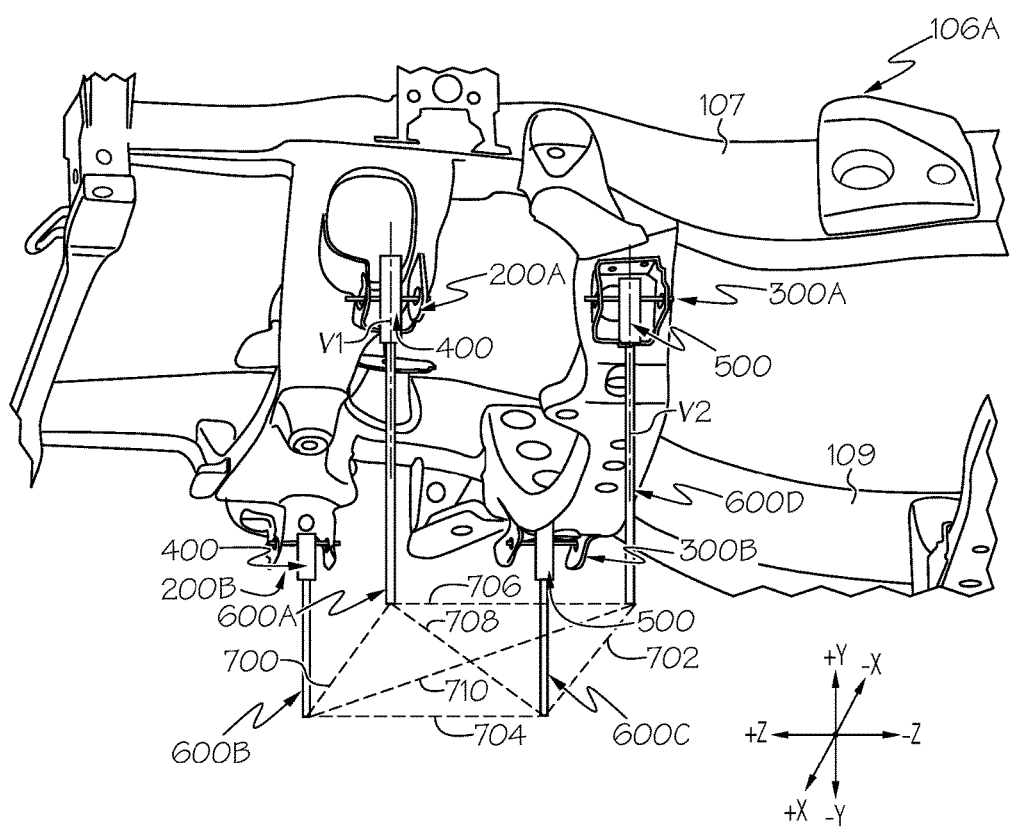
FIG. 8 schematically illustrates the perspective view of the frame of FIG. 3 including a lower control arm bracket dimension verifier tool system assembly having center point verifiers and extension rods respectively extending therefrom to measure a set of dimensions, according to one or more embodiments shown and described herein.

One embodiment of a bracket pocket dimensional verifier tool is depicted in FIG. 8. While the bracket pocket dimensional verifier tool of FIG. 8 is illustrated to be applied with respect to lower control arm bracket pockets, application of the tool to other bracket pockets is within the scope of this disclosure, such as application of the tool to upper control arm bracket pockets, and/or other features, to allow for similar dimensional verification based on center point determination of a feature and relation verification based on the determined center points across as set of features. Further, the tool of FIG. 8 is meant to be formed with dimensions suitable for alignment and placement against a particular vehicle feature of a particular make and model of a vehicle and thus may differ in dimensional sizes and placement points between vehicles of different makes and models. Various embodiments of bracket pocket dimensional verifier tools will be described in further detail herein with specific reference to the appended drawings.

FIG. 1 generally depicts an embodiment of a vehicle 100. As described herein, a forward-rearward or longitudinal direction of the vehicle 100 is associated with the +/− vehicle Z-direction depicted in FIG. 1. A lateral direction of the vehicle 100 is associated with the +/− vehicle X-direction depicted in FIG. 1, and is transverse to the forward-rearward direction. An upward-downward direction of the vehicle 100 is associated with the +/− vehicle Y-direction depicted in FIG. 1. Further, the terms "forward," "rearward," "downward," "inboard," "inward," "inner," "outboard," "outward," and "outer" are used to describe the relative positioning of various components of the vehicle, vehicle features, and the tools described herein.

The vehicle 100 includes a rear portion 102 including a body panel assembly 104 that is supported by a vehicle chassis such as a frame 106 of the vehicle 100. A suspension system, indicated by the area 108, connects the frame 106 to a set of wheels 110 of the vehicle 100. For example, the frame 106 includes front and rear sets of bracket pockets, including lower and upper control arm bracket pockets, that are welded or otherwise attached to or formed integrally with the frame 106. These bracket pockets include cam slots that receive cam nuts to position bushings onto which first ends of control arms attach. Second ends of the control arms may attach to ball joints associated with spindle features of the wheels 110 to attach the wheels 110 to the frame 106. Such suspension systems allow relative motion between the wheels 110 to the frame 106 and keep ride quality generally smooth and isolated from uneven surfaces such as bumpy roads and the like.

Figure 3:
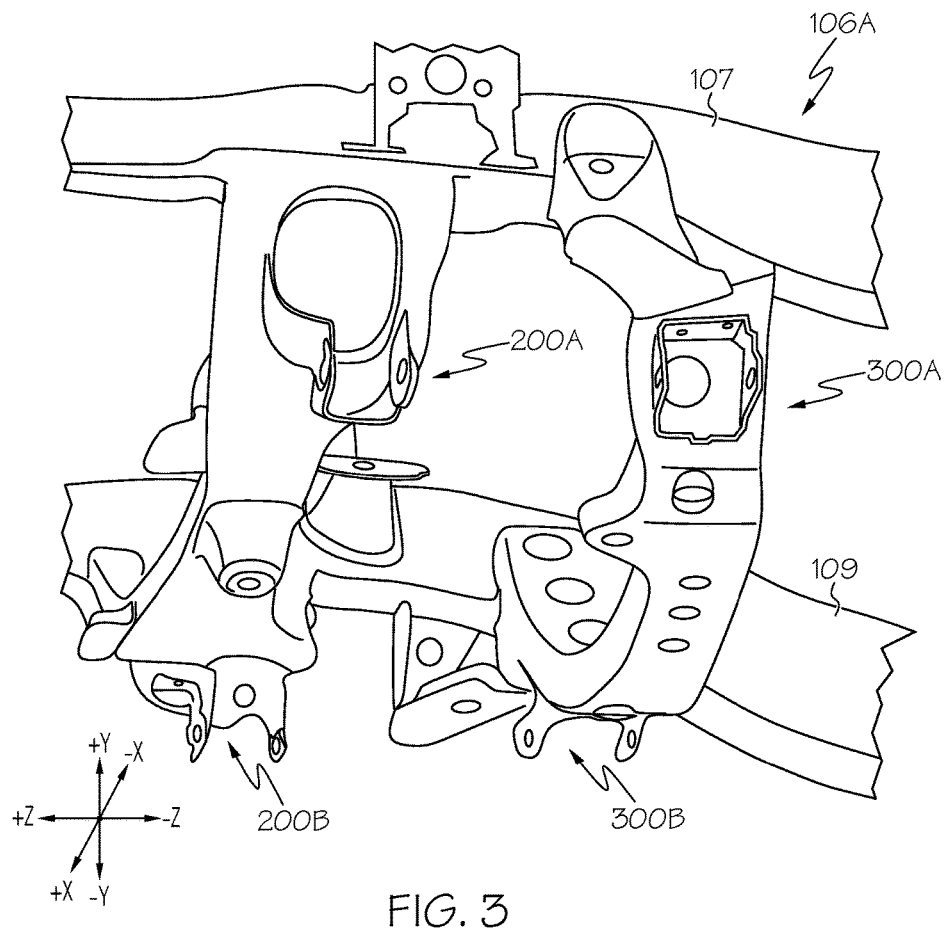
FIG. 3 schematically illustrates a magnified perspective view from a viewpoint facing from a longitudinally extending first side member to an oppositely and laterally spaced second side member of the frame of FIG. 2, including a pair of lower control arm bracket pockets associated with the first side member and rear view of a pair of lower control arm bracket pockets associated with the second side member, according to one or more embodiments shown and described herein.

FIG. 3 shows a perspective view of the frame 106 of the vehicle 100 of FIG. 1. The frame 106 includes a front portion 106A and a rear portion 106B. The frame 106 includes a pair of side members 107, 109 that are spaced apart from one another in the lateral direction of the vehicle 100. The side members 107 and 109 extend in the longitudinal direction. The side members 107 and 109 may extend between at least front suspension mounts 111, 113 and rear suspension mounts (not shown) that are positioned rearwardly of the front suspension mounts 111, 113 in the longitudinal direction. In some embodiments, the side members 107, 109 may be formed integrally along their lengths, or the side members 107, 109 may be formed from a plurality of vehicle structural components coupled together so as to transfer loads. In ordinary operation, the side members 107, 109 may contribute to overall vehicle stiffness, such that forces introduced to the front suspension mounts 111, 113 and the rear suspension mounts can be reacted to by the frame 106.

The front portion 106A of the frame 106 includes a forward pair of lower control arm bracket pockets 200 connected to the side members 107 and 109 and a rearward pair of lower control arm bracket pockets 300 connected to the side members 107 and 109. In particular, FIG. 3 illustrates a magnified perspective view of the front portion 106A and shows side views of a pair of lower control arm bracket pockets 200A, 300A from the side member 107 of a first side of the frame 106 and a pair of lower control arm bracket pockets 200B, 300B from the side member 109 of an opposite, second side of the frame 106.

Figure 4:
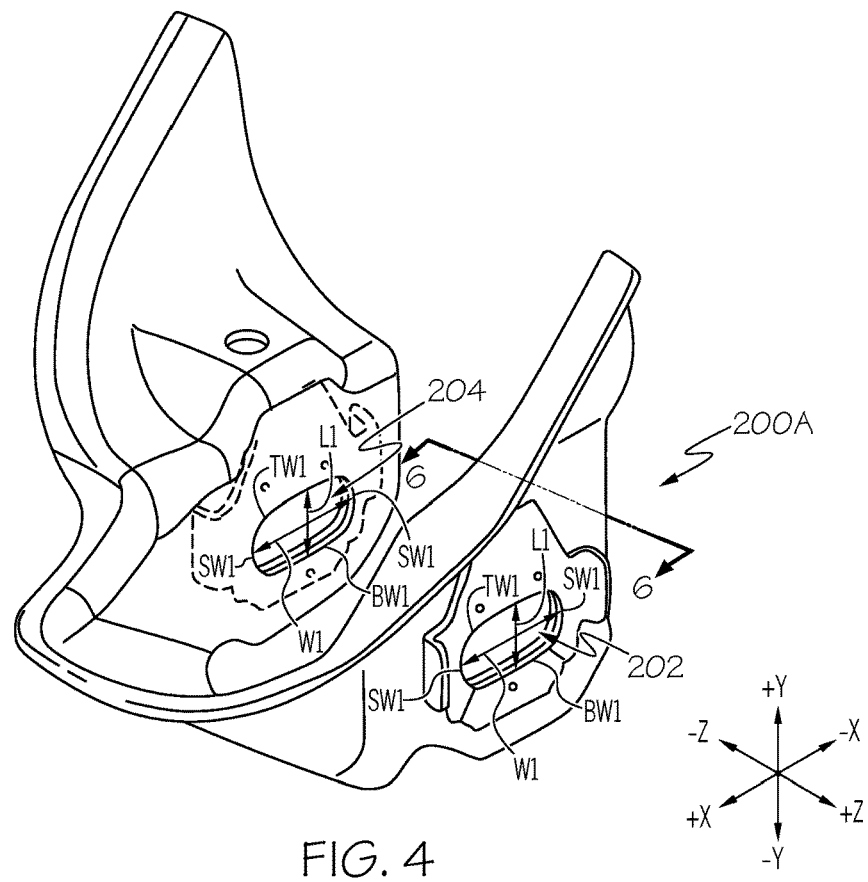
FIG. 4 schematically illustrates a rear perspective view of a front bracket pocket of the pair of lower control arm bracket pockets associated with the first second side member of the frame of FIG. 3, according to one or more embodiments shown and described herein.

FIG. 4 shows a rear perspective view of the front bracket pocket 200A of the pair of lower control arm bracket pockets 200A, 300A associated with the side member 107. The illustrated coordinate X, Y, Z axes in FIG. 4 are indicative of a placement of the front bracket pocket 200A of FIG. 3 along the side member 107. The front bracket pocket 200A includes a pair of cam slots 202, 204 that receive cam bolts to hold a bushing in place between the pair of cam slots 202, 204. The cam slot 202 is defined within a bracket wall 222 and is disposed between an interior face 224 and an exterior face 226 of the bracket wall 222. The cam slot 204 is defined within a bracket wall 232 and is disposed between an interior face 234 and an exterior face 236 of the bracket wall 222. Each of the cam slots 202, 204 are elongated and include a width W1 between a pair of side walls SW1 that is greater than a length L1 between a top wall TW1 and a bottom wall BW1. The width W1 of the cam slots 202, 204 may be, for example, 41 mm. The length L1 of the cam slots 202, 204 may be, for example, 23 mm.

Figure 5:
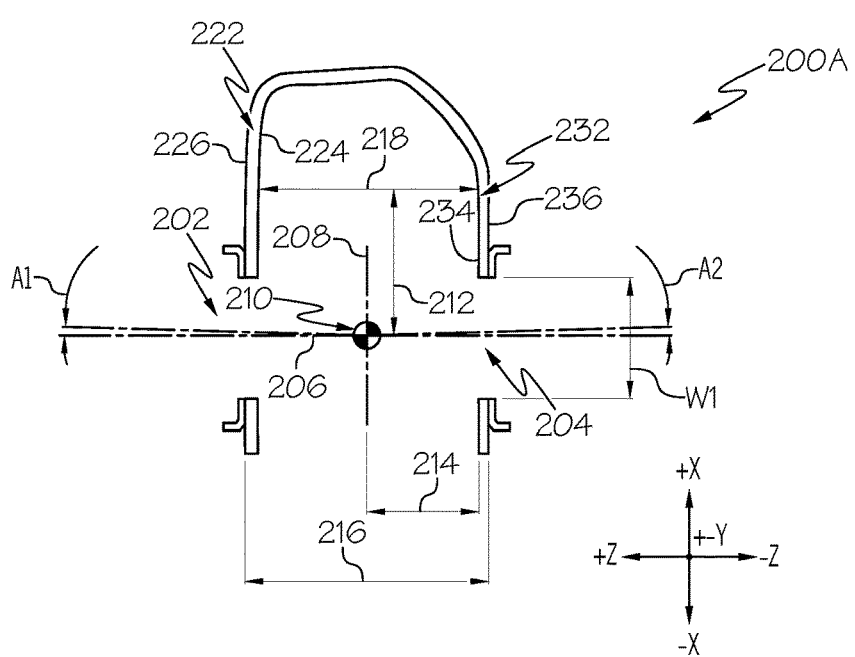
FIG. 5 schematically illustrates a cross-sectional view across line 6-6 of FIG. 4, according to one or more embodiments shown and described herein.

FIG. 5 shows a cross-sectional view across line 6-6 of FIG. 4. A longitudinal axis 206 extends between aligned centers of the pair of elongated cam slots 202, 204 and is intersected by a vertical axis 208 to define a center point 210 between the pair of elongated cam slots 202, 204. Embodiments of the bracket pocket dimensional verifier tools as described herein and in greater detail below are able to register center points between cam slots 202, 204 to verify a desired distance of the center point. For example, the desired distance may be a distance between center point 210 and a center of the cam slot 204 along the longitudinal axis 206 that is illustrated as a distance 214, which may be, for example, 39 mm. The center point 210 may deviate from normal along the longitudinal axis 206 with respect to the cam slot 202 at an angle A1, which may be, for example, 1.52 degrees. Additionally, the center point 210 may deviate from normal along the longitudinal axis 206 with respect to the cam slot 204 at an angle A2, which may also be, for example, 1.52 degrees.

A distance 216 is illustrated along the longitudinal axis 306 between centers of the cam slots 202, 204 (as well as between ends of the bracket wall 222 and the bracket wall 232 in the −X direction away from the longitudinal axis 206). A distance 218 between interior faces 224 and 234 of the bracket walls 222 and 232 along a plane disposed away from the longitudinal axis 206 in the +X direction may be less than the distance 216. A distance 212 is measurable between the longitudinal axis 206 and the distance 218 and may be less than the distance 218.

Figure 6:
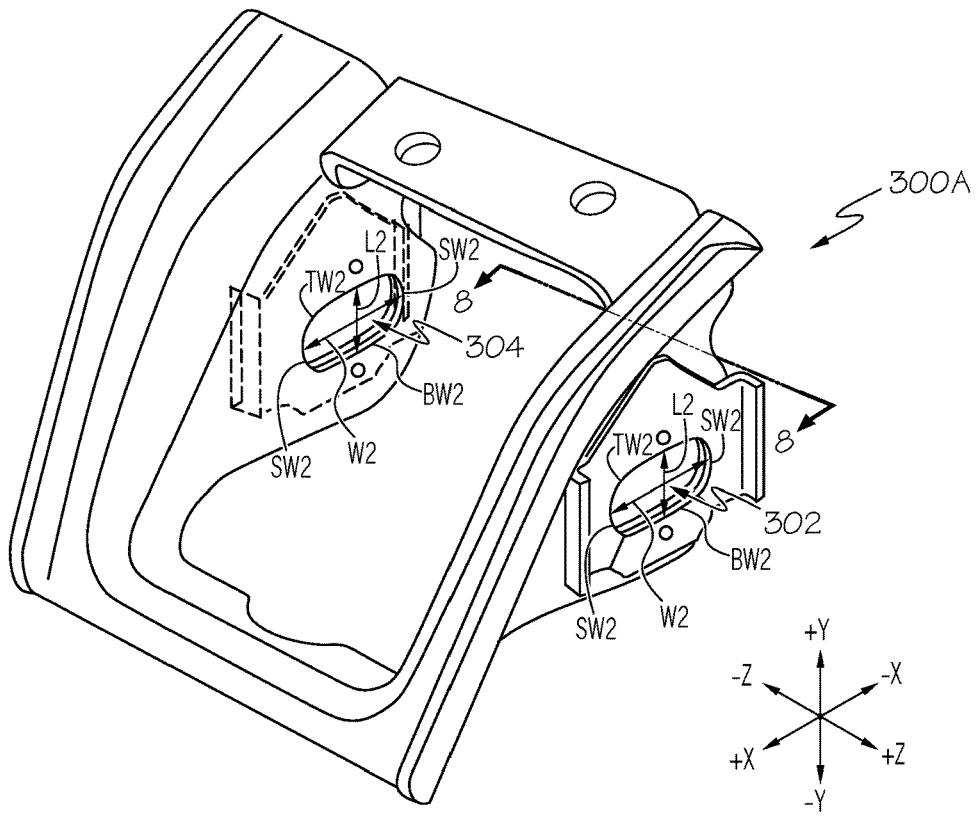
FIG. 6 schematically illustrates a rear perspective view of a rear bracket pocket of the pair of lower control arm bracket pockets associated with the first second side member of the frame of FIG. 3, according to one or more embodiments shown and described herein.

FIG. 6 shows a rear perspective view of a rear bracket pocket 300A of the pair of lower control arm bracket pockets associated with the side member 107 of the frame of FIG. 3. The illustrated coordinate X, Y, Z axes in FIG. 6 are indicative of a placement of the rear bracket pocket 300 A of FIG. 3 along the side member 107 of the front portion 106A. The rear bracket pocket 300A includes a pair of cam slots 302, 304 meant to receive cam bolts to hold a bushing in place between the pair of cam slots 302, 304. The cam slot 302 is defined within a bracket wall 322 and is disposed between an interior face 324 and an exterior face 326 of the bracket wall 322. The cam slot 304 is defined within a bracket wall 332 and is disposed between an interior face 334 and an exterior face 336 of the bracket wall 322. Each of the cam slots 302, 304 are elongated and include a width W2 between a pair of side walls SW2 that is greater than a length L2 between a top wall TW2 and a bottom wall BW2. The width W2 of the cam slots 302, 304 may be, for example, 35.5 mm. The length L2 of the cam slots 302, 304 may be, for example, 17.5 mm.

Figure 7:
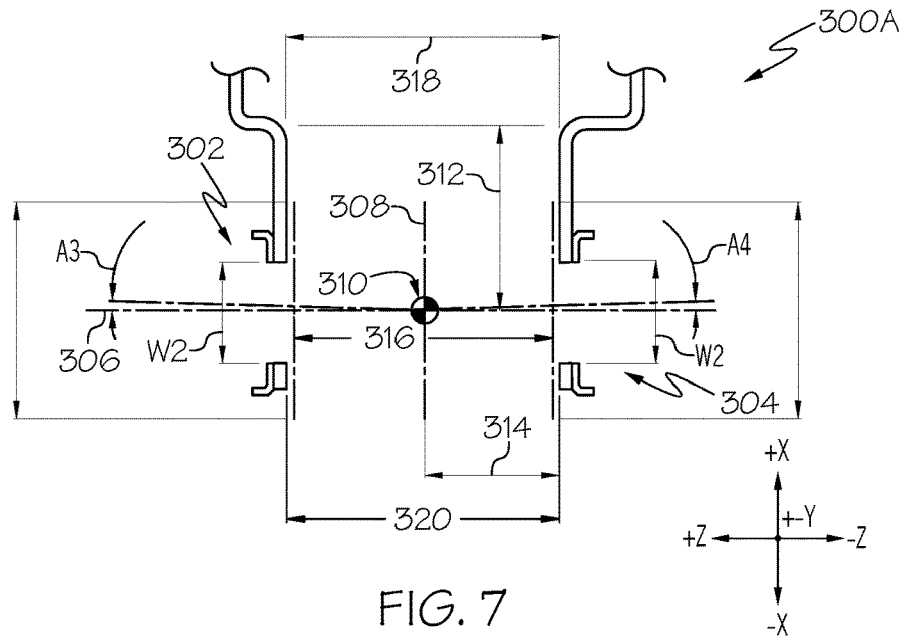
FIG. 7 schematically illustrates a cross-sectional view across line 8-8 of FIG. 6, according to one or more embodiments shown and described herein.

FIG. 7 schematically illustrates a cross-sectional view across line 8-8 of FIG. 4. A longitudinal axis 306 extends between aligned centers of the pair of elongated cam slots 302, 304 and is intersected by a vertical axis 308 to define a center point 310 between the pair of elongated cam slots 302, 304. Embodiments of the bracket pocket dimensional verifier tools as described herein and in greater detail below are able to register center points between cam slots 302, 304 to verify a desired distance of the center point. For example, the desired distance may be a distance between center point 310 and a center of the cam slot 304 along the longitudinal axis 306 that is illustrated as is a distance 314, which may be, for example, 48.4 mm. The center point 310 may deviate from normal along the longitudinal axis 306 with respect to the cam slot 302 at an angle A3, which may be, for example, 1.43 degrees. Additionally, the center point 310 may deviate from normal along the longitudinal axis 306 with respect to the cam slot 304 at an angle A4, which may be, for example, 1.43 degrees. A distance 316 measured along the longitudinal axis 306 between centers of the cam slots 202, 204 may be, for example, 92.75 mm having a positive or negative tolerance of about 0.75 mm.

A distance 318 is illustrated between interior faces 324 and 334 of the bracket walls 322 and 332 along a plane disposed away from the longitudinal axis 306 in the +X direction before the bracket walls 322, 332 begin to outwardly flange. A distance 320 is shown between ends of the bracket wall 322 and the bracket wall 334 in the −X direction away from the longitudinal axis 306 and may be greater than the distance 318. A distance 312 is measurable between the longitudinal axis 306 and the distance 318 and may be less than the distance 318.

FIG. 8 illustrates the magnified perspective view of the front portion 106A of the frame 106 of FIG. 3 and further includes a lower control arm bracket dimension verifier tool system assembly having center point verifiers 400, 500 and extension rods 600 respectively extending therefrom to measure a set of dimensions 700-710. For example, a pair of the extension rods 600A, 600B extend from a pair of center point verifiers 400 that are each disposed within oppositely facing front bracket pockets 200A, 200B on, respectively, the side member 107 and the side member 109 of the front portion 106A of the frame 106. In particular, a first extension rod 600A extends from the center point verifier 400 disposed within the front bracket pocket 200A on the side member 107, and a second extension rod 600B extends from the center point verifier 400 disposed within the front bracket pocket 200B on the side member 109. Further, a pair of the extension rods 600C, 600D extend from a pair of center point verifiers 500 that are each disposed within oppositely facing rear bracket pockets 300A, 300B on, respectively, the side members 107, 109 of the front portion 106A of the frame 106. For example, a third extension rod 600C extends from the center point verifier 500 disposed within the rear bracket pocket 300B on the side member 109 of the front portion 106A, and a fourth extension rod 600D extends from the center point verifier 500 disposed within the front bracket pocket 300A on the side member 107.

In embodiments, a straight edge device may be utilized to ensure ends of the extension rods are positioned at a desired alignment with respect to one another. The straight edge device may include, for example, a machined steel piece with a precision straight edge, a laser device to detect a straight edge, or a like device that is capable of straight edge detection. A pair of the extension rods, such as the extension rods 600A and 600B, may be positioned to be aligned with a surface axis, which is generally perpendicular with respect to a generally straight and flat underlying surface (whether virtual or actual) such as a floor above which the frame 106 is positioned. Ends of the extension rods 600A, 600B should be able to sit flush against and/or be verified by the straight edge device when disposed in such a position. Should the extension rods 600, 600A be desired to be angled with respect to the surface axis at, for example, mirroring or substantially the same angles, portions of the ends of the angled extension rods 600A, 600B should still be able to abut against and/or be verified by the straight edge device. In embodiments, a bevel gage may be utilized and set to a desired angle to verify that the extension rods 600A, 600B are angled at substantially the same angles away from the surface axis. By using the bevel gage to verify the matching angles, and the straight edge to verify a desired alignment of the extension rods 600A, 600B, a level of dimensional placement of the extension rods 600A, 600B with respect to the virtual or actual underlying surface may be verified. If, however, one of the pair of extension rods 600A, 600B is measured as offset from the straight edge device and is not generally aligned with the other of the pair of extension rods 600A, 600B, and/or if one of the pair of extension rods 600A, 600B is measured as offset from the bevel gage when used in combination with the straight edge device, then an indication may be provided to a user that the dimensional placement of the bracket pockets 200A, 200B with respect to the front portion 106A of the frame 106 may not be correct. Thus, a correct dimensional placement may not be verified. If, by contrast, the extension rods 600A, 600B are generally aligned along a similar plane and are set at the desired angles (for example, at an angle parallel to, at angles mirroring, or otherwise at substantially similar angles with respect to the surface axis) such that the pair of extension rods 600A, 600B generally abut and/or are verified by the straight edge device, then the user is provided with an indication of a level of dimensional verification being passed. The user may then proceed to checking dimensional alignment of measurable dimensions between the extensions rods, as described further below. The straight edge device may also be utilized when locking the center point verifiers 400, 500 in place to ensure appropriate locking and positioning of the center point verifiers 400, 500 and associated extension rods in a three-dimensional space and with respect to one another. It is within the scope of this disclosure that the measured pair of extension rods may be any of extension rods 600A, 600B, 600C, 600D measured with respect to another extension rod to verify that a generally straight edge, or other desired angular alignment, between the measured extension rods has been achieved, and that dimensions between the extensions rods may be measured to further verify correct dimensional placement.

A dimension 700 is measureable between ends of the first extension rod 600A and the second extension rod 600B, with the first extension rod 600A extending from the center point 210 of the front bracket pocket 200A and the second extension rod 600B extending from the center point 210 of the front bracket pocket 200B. A dimension 702 is measureable between ends of the third extension rod 600C and the fourth extension rod 600D, with the third extension rod 600C extending from the center point 310 of the rear bracket pocket 300B and the fourth extension rod 600D extending from the center point 310 of the rear bracket pocket 300A. A dimension 704 is measureable between ends of the second extension rod 600B and the third extension rod 600C, and a dimension 706 is measureable between ends of the first extension rod 600A and the fourth extension rod 600D.

Measurements of approximately 90 degree angles between adjacent outer dimensions 700-706 indicate a rectangular shape and may verify dimensional placement of the set of fourth lower control arm bracket pockets. Further, a diagonal measurement 708 may also be measured or calculated between ends of the first extension rod 600A and the third extension rod 600C. For example, the diagonal measurement 708 may be calculated after determining an angle between adjacent dimensions 700, 706 or 702, 704 that the diagonal measurement intersects. Alternatively, with a measured diagonal measurement 708, angles between adjacent dimensions 700, 706 or 702, 704 may be calculated.

Additionally, a diagonal measurement 710 may be measured or calculated between ends of the second extension rod 600B and the fourth extension rod 600D. For example, the diagonal measurement 710 may be calculated after determining an angle between adjacent dimensions 700, 704 or 702, 706 that the diagonal measurement intersects. Alternatively, with a measured diagonal measurement 708, angles between adjacent dimensions 700, 706 or 702, 704 may be calculated.

Additional verification measurements may be applied, such as confirming that the dimensions 700 and 702 are equal, and that the dimensions 704 and 706 are equal, at least confirming the shape of a parallelogram between the extension rods 600A-600D. Further, if 90 degrees angles are present between the adjacent dimensions 700, 706; dimensions 706, 702; dimensions 702, 704; and dimensions 704, 706, the parallelogram may be confirmed to be a rectangle. Measured dimensions 700-708 may be used via calculations, for example, to mathematically determine the angles between the adjacent dimensions 700, 706; dimensions 706, 702; dimensions 702, 704; and dimensions 704, 706. Further, a finding that the dimension 708 is equal to the dimension 710 also would indicate the shape of a rectangle between the extensions rods 600A-600D.

Figure 9:
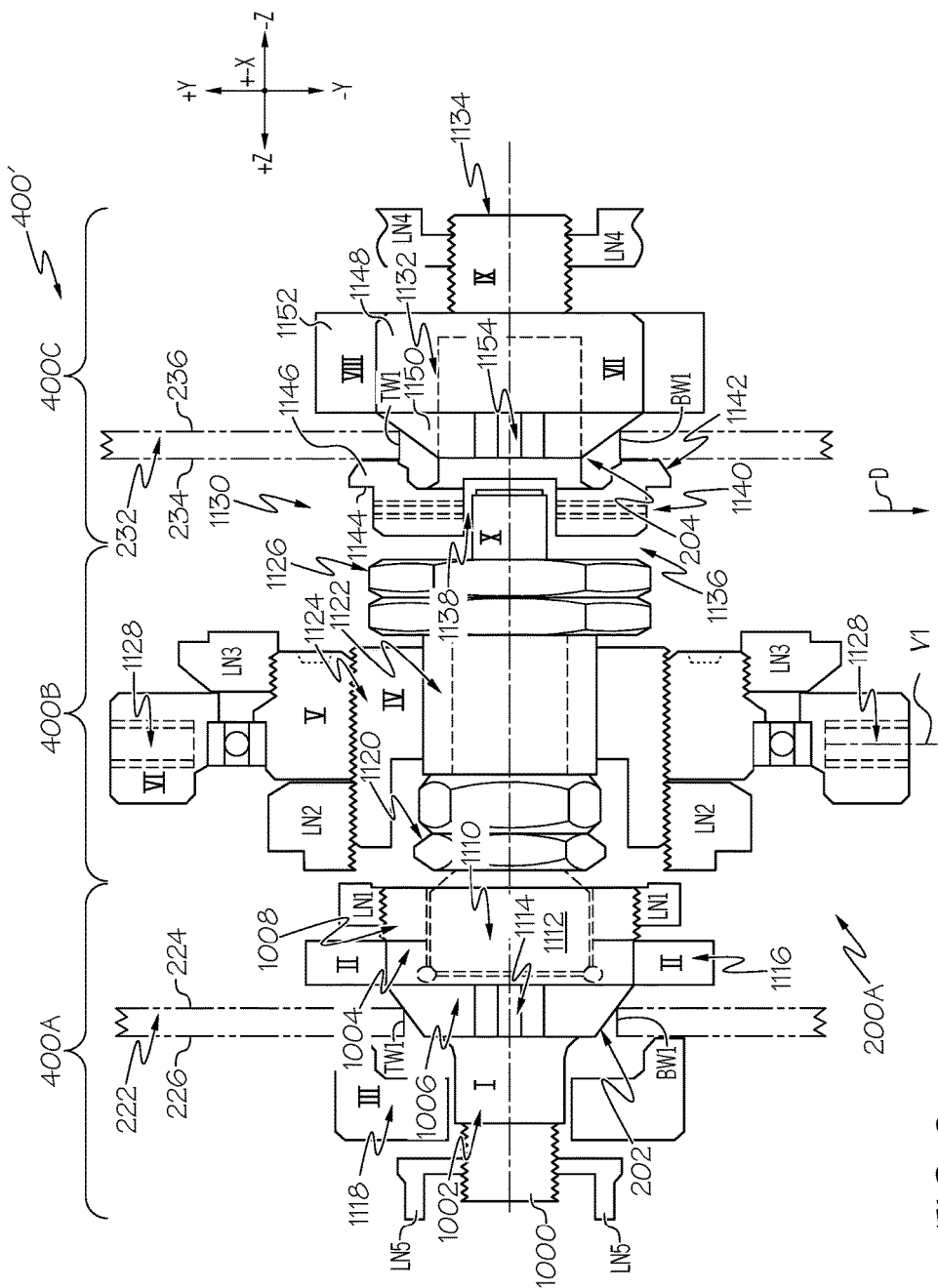
FIG. 9 schematically illustrates an example center point verifier for the front bracket pocket of the pair of lower control arm bracket pockets associated with the first side member of the frame of FIG. 8, according to one or more embodiments shown and described herein.

FIG. 9 illustrates an example center point verifier 400' assembled within the front bracket pocket 200A of the pair of lower control arm bracket pockets 200A, 300A associated with the side member 107 of the frame of FIG. 8. A similar center point verifier 400' may be used with an oppositely facing lower control arm bracket pocket 200B of the pair of lower control arm bracket pockets 200B, 300B associated with the side member 109 of the frame of FIG. 8. The center point verifier 400' includes a first end exterior sub-assembly 400A, an intermediate sub-assembly 400B, and a second end exterior sub-assembly 400C, each of which will be described in greater detail below.

I. Example Center Point Verifier 400'

A. First End Exterior Sub-Assembly 400A

A portion of the first end exterior subassembly 400A is configured for insertion through the first cam slot 202 of the lower control arm front bracket pocket 200 and is adjustable to lock to the bracket wall 222 defining the first cam slot 202, as will be described in greater detail further below. The first end exterior sub-assembly 400A includes a first slot registration device I, a first interior slot registration device II, a first exterior registration device III, a first interior lock nut device LN1, and a first exterior lock nut device LN5.

The first slot registration device I includes a first threaded nut portion 1000 extending from a slot projection portion 1002, an intermediate portion 1004, an intermediate chamfered portion 1006, and an interior threaded end 1008. An outer diameter of the first slot registration device I may be, for example, about 1 inch. A length of the first slot registration device I between an end of the first threaded nut portion 1000 and an end of the interior threaded end 1008 may be, for example, about 1.75 inches.

The interior threaded end 1008 includes a blind bore 1110 shaped to receive a projecting end 1112 of a swivel pad 1120 of the intermediate portion IV of the intermediate sub-assembly 400B in a press-fit, as will be described in greater detail below.

Figure 10:
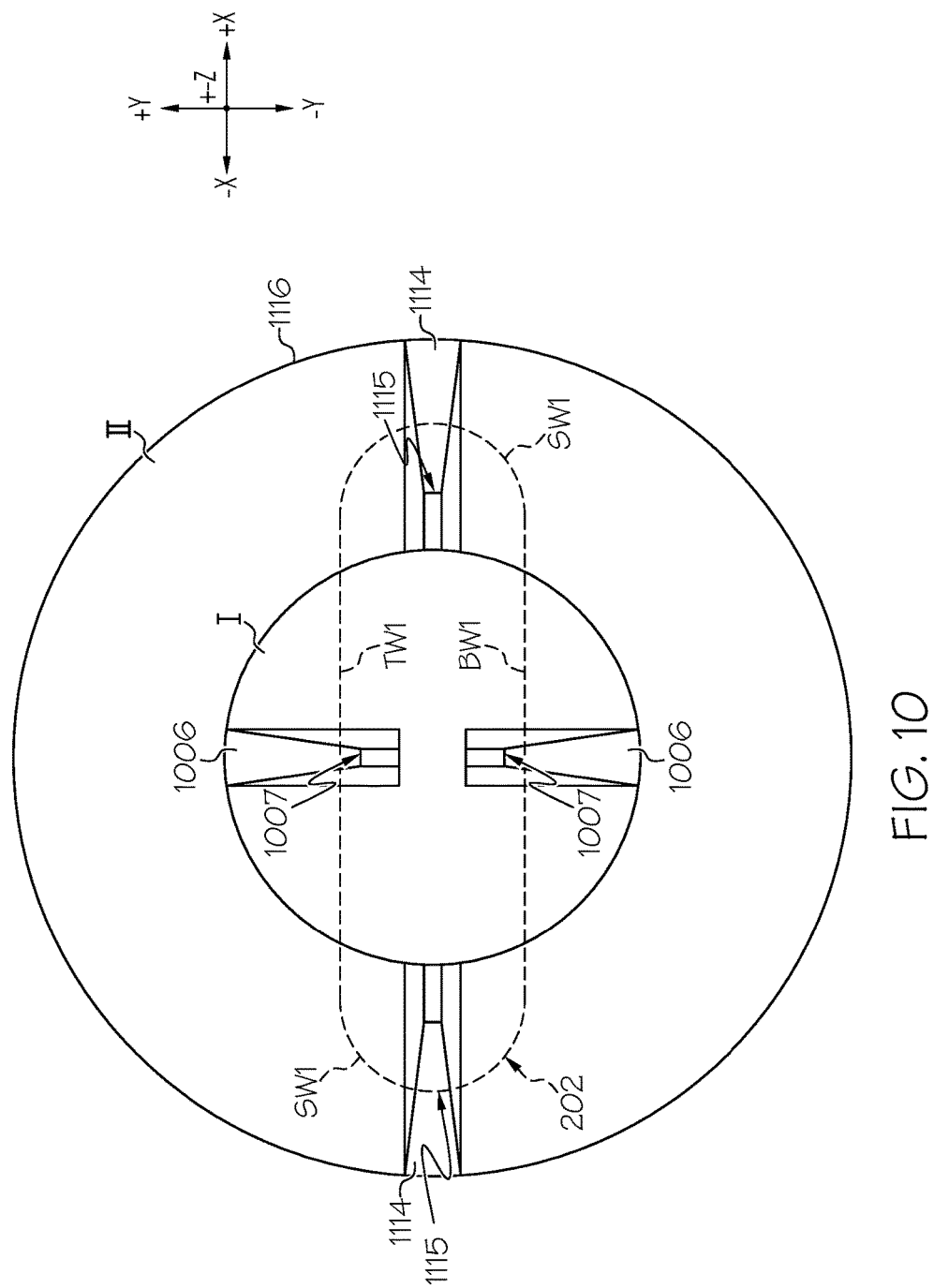
FIG. 10 schematically illustrates chamfered components of the example center point verifier of FIG. 9 that registered against a cam slot of the front bracket pocket of FIG. 9, according to one or more embodiments shown and described herein.

The first threaded nut portion 1000 is configured to extend through the first cam slot 202 from insertion through the interior face 224 of the bracket wall 222 defining the first cam slot 202 through to the exterior face 226 of the bracket wall 222. The intermediate chamfered portion 1006 extends from the intermediate portion 1004 toward the slot projection portion 1002. As shown in FIG. 10, the intermediate chamfered portion 1006 is configured to be gripped within the first cam slot 202 by, for example, a first pair of opposing edges of the first cam slot 202 (such as, for example, the edges defined by the top wall TW1 and the bottom wall BW1). For example, FIG. 10 shows an area 1007 where the intermediate chamfered portion 1006 is gripped by and meets the top wall TW1 and the bottom wall BW1 of the first cam slot 202 to register the first slot registration device I along and within the first cam slot 202. The intermediate chamfered portion 1006 may have a length in the Z-direction of 6 mm and a height in the Y-direction of 3 mm.

The first interior slot registration device II includes a chamfered portion 1114 extending from an end portion 1116. The end portion 1116 defines an aperture configured to be disposed about the intermediate portion 1004 of the first slot registration device I. As shown in FIG. 10, the chamfered portion 1114 is configured to be gripped within the first cam slot 202 by, for example, a second pair of opposing edges of the first cam slot 202 (such as, for example, the edges defined by the sidewalls SW1). For example, FIG. 10 shows an area 1115 where the chamfered portion 1114 is gripped by and meets the sidewalls SW1 of the first cam slot 202 to register the first interior slot registration device II along and within the first cam slot 202. The chamfered portion 1114 may have a length in the Z-direction of 6 mm and a height in the Y-direction of 1.5 mm. An outer diameter of the first interior slot registration device II may be, for example, about 1.75 inches. Further, a length between the end portion 1116 and an end of the interior threaded end 1008 may be, for example, about 0.5 inches.

The first interior lock nut device LN1 is configured to be disposed about and lockable against the interior threaded end 1008 of the first slot registration device I. For example, the first interior lock nut device LN1 locks the first slot registration device I in place with respect to the interior face 224 of the bracket wall 222 defining the first cam slot 202.

The first exterior registration device III is disposed about the slot projection portion 1002 of the first slot registration device I and has an abutting portion 1118 abutting and registering against the exterior face 226 of the wall 222 defining the first cam slot 202.

The first exterior lock nut device LN5 is configured to be disposed about and lockable against the first threaded nut portion 1000 of a portion of the first slot registration device I that is exterior to the first exterior registration device III such that the first exterior lock nut device LN5 may lock the first slot registration device I and the first exterior registration device III against and in place with respect to the exterior face 226 of the bracket wall 222 defining the first cam slot 202.

B. Intermediate Sub-Assembly 400B

Figure 11:
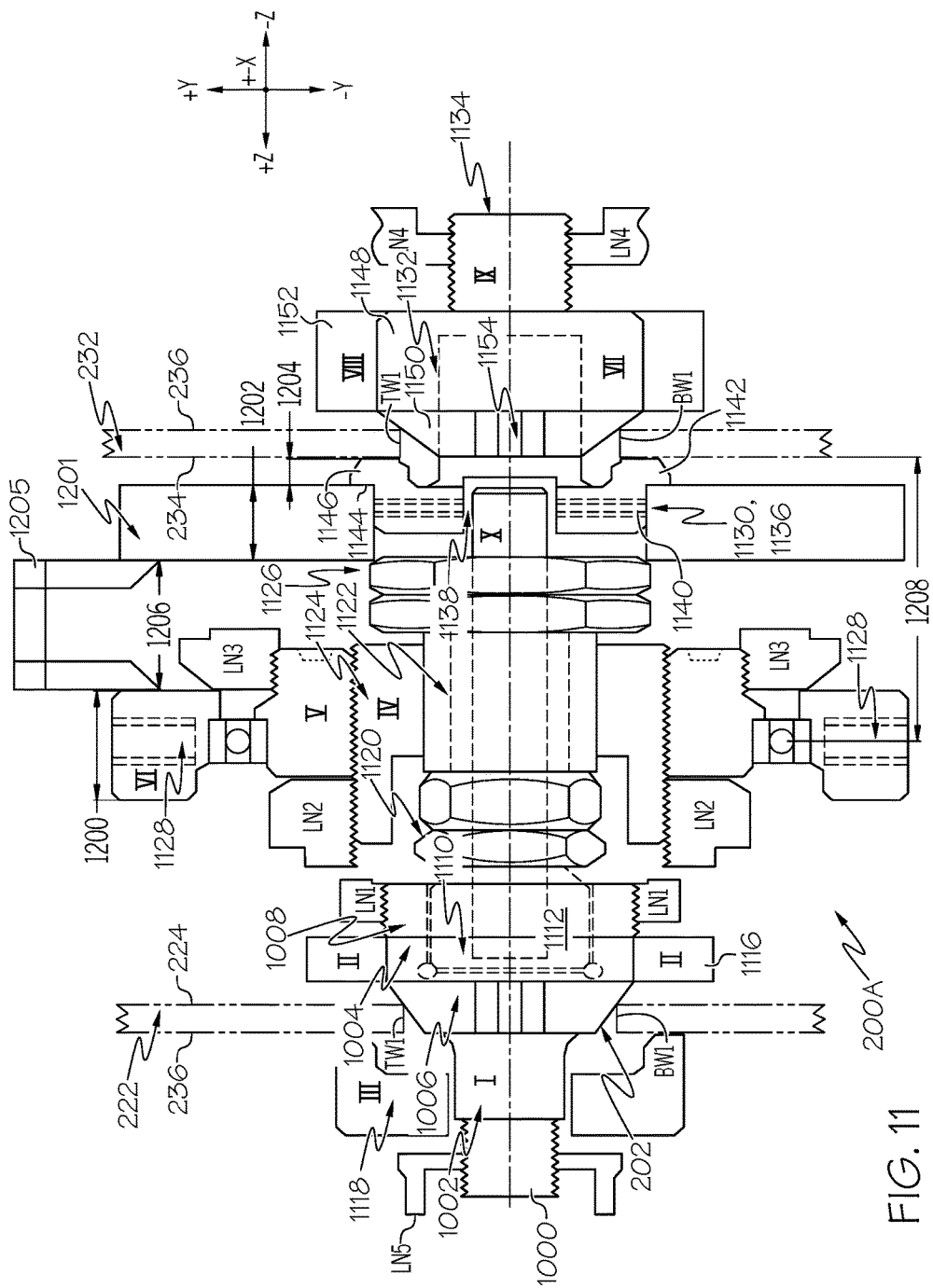
FIG. 11 schematically illustrates the example center point verifier of FIG. 9 including additional measurement components, according to one or more embodiments shown and described herein.

The intermediate sub-assembly 400B includes a first intermediate lock nut device LN2, a second intermediate lock nut device LN3, a swivel pad 1120, an intermediate portion IV including a swivel pad 1120, an adjustable thread device V, a pair of locking hex nuts 1126, and an extension rod receiving feature VI. The swivel pad 1120 is configured to account for angles A1, A2, which may be non-normal, between bracket walls 222, 232 defining the first and second cam slots 202, 204, respectively. The intermediate portion IV also includes the projecting end 1112 of the swivel pad 1120, a shaft end 1122, and a threaded nut 1124. The projecting end 1112 and the shaft end 1122 of the intermediate portion IV together define a through bore configured to receive the shaft X (as shown in FIG. 11). The through bore of the intermediate portion IV may have a first inner diameter and a second inner diameter that is greater than the first inner diameter. A length of the intermediate portion IV may be 1⅛ inches with an outer diameter of 1⅜ inches.

The shaft X may have a total length of about 2¼ inches. While in an embodiment, the shaft X may have a set diameter throughout, in another embodiment, the shaft may have diameters meant to press-fit against respectively receiving through bores. For example, the shaft X may have a first, second, and third portion. The first portion may have a diameter of about 5/16 inches and a length of about 11/16 inches, and the first portion may be configured to fit into a bore disposed with a receiving end of the projecting end 1112 of a swivel pad 1120 of the intermediate portion IV. An end portion of the swivel pad 1120 may also be configured to be disposed around the first portion of the shaft X. The second portion of the shaft X may have a diameter of about 0.75 inches and be configured to be received within the through bore of the intermediate portion IV. Further, the third portion of the shaft X may have a length of about ⅜ inches, a diameter of about ⅜ inches, a set of receiving bores for set screws disposed 180 degrees apart, and be configured to be received into the blind bore 1138 of the second slot registration device IX as described in greater detail further below.

Referring again to FIG. 9, a first end of the shaft end 1122 of the intermediate portion IV is configured to attach to the swivel pad 1120. A projecting end of the shaft X projects from a second end of the shaft end 1122, and the pair of locking hex nuts 1126 are configured to be disposed about and lock against a portion of the projecting end of the shaft X. The threaded nut 1124 is configured to be disposed about the shaft end 1122, and the adjustable thread device V is configured to be disposed about the threaded nut 1124. The adjustable thread device V may have a set of four equally spaced press-fit apertures of about 3/16 inch diameters, an outer diameter of about 2 3/16 inches, and a length of about 1 1/16 inches.

The extension rod receiving feature VI is configured to be disposed about the adjustable thread device V and defines at least one extension rod receiving aperture 1128. For example, the extension rod receiving feature VI may include a plurality of extension rod receiving apertures 1128, such as a set of four approximately equidistantly positioned extension rod receiving apertures 1128. The extension rod receiving feature VI may have a length of about 5/8 inches and an outer diameter of about 3 1/4 inches. The extension rod receiving feature VI may have a lead in chamfer at about a 45 degree angle between the inner diameter and the interior diameter portions.

The second intermediate lock nut device LN3 is configured to lock the extension rod receiving feature VI to the adjustable thread device V. The first intermediate lock nut device LN2 is configured to lock the threaded nut 1124 of the intermediate portion IV against the adjustable thread device V. The pair of locking hex nuts 1126 are configured to lock the shaft X in place when the first end exterior sub-assembly 400A and the intermediate sub-assembly 400B are attached such that the attached sub-assemblies 400A, 400B are adjustable to be spaced and locked a predetermined distance away from the second exterior sub-assembly 400C, as will be described in greater detail below.

C. Second End Exterior Sub-Assembly 400C

The second end exterior sub-assembly 400C includes a second slot registration device IX, a second exterior registration device VII, a third exterior registration device VIII, and a second exterior lock nut device LN4.

The second slot registration device IX includes an interior portion 1130, an intermediate portion 1132, and a threaded end portion 1134. The interior portion 1130 includes an interior end portion 1136. The interior end portion 1136 defines a blind bore 1138 configured to receive the projecting end of the shaft X. The interior end portion 1136 further includes a first circumferential portion 1140 and a second circumferential portion 1142 that are separated by a ledge 1144. The first circumferential portion 1140 has a first portion thickness and a first portion diameter. The second circumferential portion 1142 has a second portion thickness and a second portion diameter. The second portion diameter of the second circumferential portion 1142 is greater than the first portion diameter of the first circumferential portion 1140. The second circumferential portion 1142 has flanges 1146 that are configured to abut against the interior face 234 of the second bracket wall 232 defining the cam slot 204. It is contemplated that fasteners such as set screws and the like may be utilized to fasten the flanges 1146 to the bracket wall 232. It is further contemplated that fasteners may be used with other components of the sub-assemblies 400A, 400B, and 400C to fasten components to each other and/or to the bracket walls 222, 232.

The second circumferential portion 1142 of the second slot registration device IX may have an outer diameter of about 1.5 inches, the first circumferential portion 1140 may have a diameter of about 1.25 inches, and the blind bore 1138 may have a diameter of about 3/8 inches. The second slot registration device IX may have a total length of about 1.81 inches, of which the second circumferential portion 1142 may have a thickness or length of about 2/16 inches. Further, the intermediate portion 1132 includes a tapered portion length of about 1/16 inches extending inwardly at about a 45 degree angle to connect with a extension portion that has a length of about 9/16 inches and connects to the threaded end portion 1134.

The second exterior slot registration device VII includes an end portion 1148 defining a through bore, and a chamfered portion 1150 extending from the end portion 1148. The through bore of the end portion 1148 is configured to be disposed about the intermediate portion 1132 of the second slot registration device IX. The chamfered portion 1150 is configured to be gripped within a first pair of opposing edges within the second bracket wall 232 defining the second cam slot 204 (such as, for example, within the top wall TW1 and the bottom wall BW1). The chamfered portion 1150 may have a length in the Z-direction of 6 mm and a height in the Y-direction of 3 mm. The second exterior slot registration device VII may have a length of about 0.75 inches, with the end portion 1148 having a length of about 0.5 inches and the chamfered portion 1150 having a length of about 6 mm.

The third exterior slot registration device VIII includes an end portion 1152 and a chamfered portion 1154 extending from the end portion 1152. The chamfered portion 1154 is configured to be gripped within a second pair of opposing edges within the second bracket wall 232 defining the second cam slot 204 (such as, for example, within the sidewalls SW1). The chamfered portion 1154 may have a length in the Z-direction of 6 mm and a height in the Y-direction of 1.5 mm. The third exterior slot registration device VIII may have an an outer diameter of about 1 3/4 inches, and a total length of about 3/4 inches.

The second exterior lock nut device LN4 is configured to be disposed about and lockable against the threaded end portion 1134 of the second slot registration device IX exterior to the second and third exterior registration devices VII, VIII to lock the second end exterior sub-assembly 400C in place with respect to the exterior face 236 of the bracket wall 232 defining the cam slot 204.

D. Method of Assembly

In an embodiment, a method of assembly of an exemplary center point verifier within bracket walls that define a bracket pocket includes assembling a tool assembly, such as the center point verifier 400', within a first lower control arm bracket pocket 200A of a set of lower control arm brackets 200, 300 of the frame 106 of a vehicle 100. The center point verifier 400' is assembled within the first lower control arm bracket pocket 200A to determine the center point 210 between a pair of elongated cam slots 202, 204 defined by opposing walls of the first lower control arm bracket pocket 200. The method includes providing the tool assembly, such as the center point verifier 400' including the first end exterior sub-assembly 400A, an intermediate sub-assembly 400B, and a second end exterior sub-assembly 400C.

The threaded end portion 1134 of the second end exterior sub-assembly 400C is inserted through the second cam slot 204 until flanges 1146 of the second circumferential portion 1142 of the second end exterior sub-assembly 400C abut against the interior face 234 of the second bracket wall 232. As described above, the interior end portion 1136 of the second slot registration device IX defines a blind bore 1138 that is positioned to face the interior face 224 of the opposite bracket wall 222 and is configured to receive an end of the shaft X.

An aperture of the third end exterior registration device VIII receives the second end exterior registration device VII such that chamfered portions 1150, 1154 of the second and third end exterior registration devices VII, VIII are disposed in an approximate perpendicular relationship with respect to each other. The second exterior registration devices VII is are disposed about the intermediate portion 1132 of the second slot registration device IX. The chamfered portions 1150, 1154 of the second and third end exterior registration devices VII, VIII, respectively, are inserted through and abut with edges defining the second cam slot 204 such that the chamfered portions 1150, 1154 register against the walls of the second cam slot 204 in a similar manner as to how the chamfered portions 1006, 1114 register against the walls of the first cam slot (as described above with respect to FIG. 10). For example, the chamfered portion 1154 of the third exterior registration device VIII abuts with the sides walls SW1 of the cam slot 204, and the chamfered portion 1150 of the second exterior registration device VII abuts with the top wall TW1 and the bottom wall BW1 of the cam slot 204. Similarly, it should be understood that all chamfered portions described herein abut and register against cam slot walls. The locking nut device LN4 is then disposed about the threaded end portion 1134 and used to lock the second end exterior sub-assembly 400C with respect to the exterior face 236 of the bracket wall 232 defining the second cam slot 204. Thus, the locking nut device LN4 registers the third exterior registration device VIII against the width of the second cam slot 204.

The interior threaded end 1008 of the first slot registration device I includes the blind bore 1110 that receives, joins, and attaches to the projecting end 1112 of the intermediate portion IV. The first interior slot registration device II is disposed about the intermediate portion 1004 of the first slot registration device I. The chamfered portion 1114 of the first interior slot registration device II and the intermediate chamfered portion 1006 of the first slot registration device I are inserted in approximate perpendicular relation to one another through and to abut with edges defining the first cam slot 202. For example, as shown in FIG. 10, the chamfered portion 1114 of the first interior slot registration device II abuts with the sides walls SW1 of the cam slot 202, and the intermediate chamfered portion 1106 of the first slot registration device I abuts with the top wall TW1 and the bottom wall BW1 of the cam slot 202. The locking nut device LN1 is used to lock an interior side of the first end exterior sub-assembly 400A with respect the interior face 234 of the bracket wall 222 defining the first cam slot 204. For example, the locking nut device LN1 positions and registered the first interior slot registration device II against the width of the first cam slot 202.

An aperture of the first exterior registration device III is disposed about an end of the first threaded nut portion 1000 of the first slot registration device I, engaging the first slot registration device I in a close tolerance fit, until the abutting portion 1118 abuts against the exterior face 226 of the bracket wall 222. The locking nut device LN5 is then disposed about the first threaded nut portion 1000 exterior to the first exterior registration device III and used to lock an exterior side of the first end exterior sub-assembly 400A against the wall defining the first cam slot 204. Tightening the locking nut device LN5 will further register the first slot registration device I against the first cam slot 202. When the sub-assemblies 400A and 400C are registered as described above with respect to respective cam slots 202, 204, the longitudinal axis 206 intersecting the central point 210 is defined along the centers of the facing sub-assemblies 400A and 400C. As the intermediate sub-assembly 400B is attached to the first end exterior sub-assembly 400A, the shaft X may be positioned into the blind bore 1138 of the second end exterior sub-assembly 400C and secured with set screws.

For example, a portion of the shaft X extending from the intermediate sub-assembly 400B is inserted into the blind bore 1138 of the interior end portion 1136 of the second end exterior sub-assembly 400C. The adjustable thread device V may be adjusted to a predetermined distance that is measurable, as described in greater detail below with respect to FIG. 12, and the pair of locking hex nuts 1126 lock the shaft X in place such that the at least one extension rod receiving aperture 1128 of the extension rod receiving feature VI is vertically aligned with the center point 210 between the two cam slots 202, 204. In particular, a center of the at least one extension rod receiving aperture 1128 is positionable along the vertical axis V1 intersecting the center point 210 to face in a downward direction D in the −Y direction. Once positioned, an extension rod 600A is inserted into the at least one extension rod receiving aperture 1128 to point in the downward direction D along the vertical axis V1.

Thus, the first tool assembly (e.g., the center point verifier 400') of a set of tool assemblies is assembled within the first lower control arm bracket pocket 200A as described above such that the extension rod 600A points downwardly in a direction aligned with the center point vertical axis V1 that intersects the center point 210 between cam slots 202, 204 of the bracket pocket 200A.

As described above, the first lower control arm bracket pocket 200A is disposed on the side member 107 of the frame 106, and the second lower control arm bracket pocket 200B is disposed opposite the first lower control arm bracket pocket 200A on the side member 109 of the frame 106. The third lower control arm bracket pocket 300B is disposed rearwardly of the second lower control arm bracket pocket 200B on the side member 109 of the frame 106, and the fourth lower control arm bracket pocket 300A is disposed rearwardly of the first lower control arm bracket pocket 200A on the side member 107 of the frame 106. The set of tool assemblies further include a second, third, and fourth tool assembly as example center point verifiers, each respectively configured to be assembled within the second lower control arm bracket pocket 200B, the third lower control arm bracket pocket 300B, and the fourth lower control arm bracket pocket 300A. For example, items such as metal tape measures or respective extension rods 600B-600D will extend downwardly along respective vertical axes that intersect center points between cam slots of the bracket pockets. For instance, extension rod 600B will extend downwardly along vertical axis V1 that intersects the center point 210 between the cam slots 202, 204 of the second lower control arm bracket pocket 200B. Further, as shown in FIG. 8, extension rods 600C, 600D will extend downwardly along vertical axis V2 that intersects the center point 310 between the cam slots 302, 304 of the third lower control arm bracket pocket 300B and the fourth lower control arm bracket pocket 300A, respectively.

FIG. 11 illustrates the example center point verifier 400' of FIG. 9 including additional dimensional measurement components. For example, FIG. 11 further illustrates the second end exterior sub-assembly 400C as including an auxiliary ring 1201 that is disposed about the first circumferential portion 1140 of the interior portion 1130 of the second slot registration device IX. The ledge 1144 of the second slot registration device IX abuts against an end of the auxiliary ring 1201, which includes a ring thickness 1202 and a ring length that is approximately equivalent to a feature length of the extension rod receiving feature VI (which also includes a feature thickness 1200).

FIG. 11 further illustrates a caliper measuring device 1205. A measurement of the predetermined distance to define the center point 210, as described above, may be determined based on a summation of half the feature thickness 1200 of the extension rod receiving feature VI, the ring thickness 1202 of the auxiliary ring 1201, a second portion thickness 1204 of the second circumferential portion 1142 of the interior portion 1130 of the second slot registration device IX, and an adjustable spacing 1206 measurable by the caliper measuring device 1205 between facing ends of the auxiliary ring 1201 and the extension rod receiving feature VI. For example, the adjustable spacing 1206 may be set such that the sum of the adjustable spacing 1206, half of the feature thickness 1200, the ring thickness 1202, and the second portion thickness 1204 equal the distance 214 at, for example, 39 mm.

To adjust the adjustable spacing 1206, the adjustable thread device V may be moved by rotation by a pin wrench until a desired dimension is achieved and determined by the caliper measuring device 1205. Upon achieving the desired dimension, the first intermediate lock nut device LN2 may secure the adjustable thread device V to the intermediate portion IV. The second intermediate lock nut device LN3 may be loosed to receive and then tightened to lock an extension rod 600 into a respective extension rod receiving aperture 1128 of the extension rod receiving feature VI such that the received extension rod 600 is prevented from rotation while being used for measurements as described herein. In embodiments, the extension rods 600 may have ends including features to secure a long tape that may be used to render measurements of dimensions as described herein.

II. Example Center Point Verifier 500'

A. First End Exterior Sub-Assembly 500A

Figure 12:
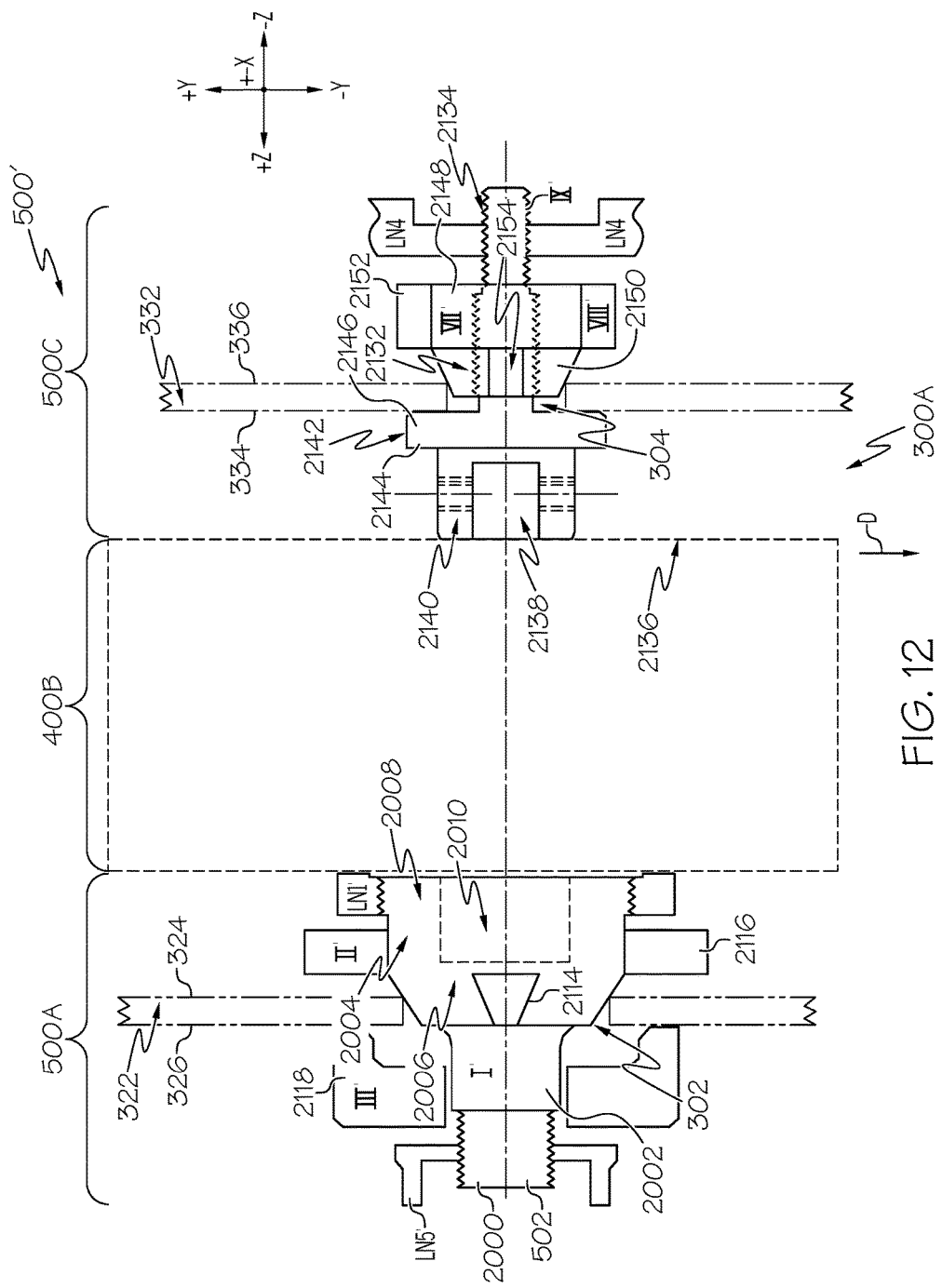
FIG. 12 schematically illustrates an example center point verifier for the rear bracket pocket of the pair of lower control arm bracket pockets associated with the first side member of the frame of FIG. 8, according to one or more embodiments shown and described herein.

As the rear bracket pockets 300A, 300B have different dimensions than the front bracket pockets 200A, 200B, different example center point verifiers 500' may be used that are designed specifically for the rear bracket pockets 300A, 300B. For example, FIG. 12 illustrates an example center point verifier 500' for the rear bracket pocket 300A of the pair of lower control arm bracket pockets 200A, 300A associated with the side member 107 of the frame of FIG. 8. A similar center point verifier 500' may be used with an oppositely facing lower control arm bracket pocket 300B associated with the side member 109 of the frame of FIG. 8.

The center point verifier 500' includes a first end exterior sub-assembly 500A, the intermediate sub-assembly 400B, and a second end exterior sub-assembly 500C. The first end exterior sub-assembly 500A is similar to the first end exterior sub-assembly 400A with some differences to account for a different structure of the rear bracket pocket 300A. Similarly, the second end exterior sub-assembly 500C is similar to the second end exterior sub-assembly 400C with some differences to account for the different structure of the rear bracket pocket 300A.

For example, the first end exterior sub-assembly 500A is configured for insertion through the first cam slot 302 of the lower control arm front bracket pocket 300 and is adjustable to lock to a bracket wall 322 defining the first cam slot 302. The first end exterior sub-assembly 500A includes a first slot registration device I', a first interior slot registration device II', a first exterior registration device III', a first interior lock nut device LN1', and a first exterior lock nut device LN5' that are assembled in a similar manner as described above with respect to the first slot registration device I, the first interior slot registration device II, the first exterior registration device III, the first interior lock nut device LN1, and the first exterior lock nut device LN5 of the first end exterior sub-assembly 400A.

For example, the first slot registration device I' includes a first threaded nut portion 2000 extending from a slot projection portion 2002, an intermediate portion 2004, an intermediate chamfered portion 2006, and an interior threaded end 2008. The first slot registration device I' may also be longer than the first slot registration device I. A length of the first slot registration device I' between an end of the first threaded nut portion 2000 and an end of the interior threaded end 2008 may be greater than the length of the first slot registration device I. However, the interior threaded end 2008 may be longer than the interior threaded end 1008. The interior threaded end 2008 includes a blind bore 2110 shaped to receive the projecting end 1112 of the intermediate portion IV of the intermediate sub-assembly 400B in a similar manner as describe above with respect to sub-assemblies 400A, 400B, for example.

The first threaded nut portion 2000 is configured to extend through the first cam slot 302 from insertion through the interior face 324 of the bracket wall 322 defining the first cam slot 302 through to the exterior face 326 of the bracket wall 322. The intermediate chamfered portion 2006 extends from the intermediate portion 2004 toward the slot projection portion 2002. The intermediate chamfered portion 2006 is configured to be gripped within the first cam slot 302 by, for example, a first pair of opposing edges of the first cam slot 302 (such as, for example, the edges defined by the top wall TW2 and the bottom wall BW2).

The first interior slot registration device II' includes a chamfered portion 2114 extending from an end portion 2116. Further, a length between the end portion 2116 and an end of the interior threaded end 2008 may be, for example, about ⅞ inches. The end portion 2116 defines an aperture configured to be disposed about the intermediate portion 2004 of the first slot registration device I'. The chamfered portion 2114 is configured to be gripped within the first cam slot 302 by, for example, a second pair of opposing edges of the first cam slot 302 (such as, for example, the edges defined by the sidewalls SW2).

B. Second End Exterior Sub-Assembly 500C

Further, the second end exterior sub-assembly 500C is configured for insertion through the second cam slot 304 of the lower control arm front bracket pocket 300 and is adjustable to lock to a bracket wall 332 defining the first cam slot 304. The second end exterior sub-assembly 500C includes a second slot registration device IX', a second exterior slot registration device VII', a third exterior registration device VIII', and may include a second exterior lock nut device LN4' that are assembled in a similar manner as described above with respect to the second slot registration device IX, the second exterior slot registration device VII, the third exterior slot registration device VIII, and the second exterior lock nut device LN4 of the second end exterior sub-assembly 400C.

The second slot registration device IX' includes an interior portion 2130, an intermediate portion 2132, and a threaded end portion 2134. The interior portion 2130 includes an interior end portion 2136. The interior end portion 2136 defines a blind bore 2138 configured to receive a projecting end of the shaft X. The interior end portion 2136 defines a first circumferential portion 2140 and a second circumferential portion 2142 that are separated by a ledge 2144. The first circumferential portion 2140 has a first portion thickness and a first portion diameter. The second circumferential portion 2142 has a second portion thickness and a second portion diameter that is greater than the first portion diameter of the first circumferential portion 2140. The second circumferential portion 2142 has a flange portion 2146 that is configured to abut against an interior face 334 of the second bracket wall 332 defining the cam slot 304.

The second circumferential portion 2142 of the second slot registration device IX' may have a slightly smaller diameter and greater thickness than the second circumferential portion 1142 of the second slot registration device IX. For example, the second circumferential portion 2142 may have an outer diameter that is less than the outer diameter of the second circumferential portion 1142. Further, the second circumferential portion 2142 may have a thickness or length of about ³/₁₆ inches, which is ¹/₁₆ of an inch greater than the thickness of the second circumferential portion 1142. Additionally, the first circumferential portion 2140 may have a diameter that is less than the diameter of the first circumferential portion 1140. The blind bore 2138 may have similar dimensions as the blind bore 1138. However, the threaded end portion 2134 may be smaller than the threaded end portion 1134 and have a diameter that is less than the diameter of the threaded end portion 1134. Further, the second slot registration device IX' may have a total length that is slightly less than the total length of the second slot registration device IX. Moreover, the intermediate portion 2132 does not include a tapered portion as present in the second slot registration device IX but rather includes an extension portion that connects to the threaded end portion 2134.

The second exterior registration device VII' may be sized smaller than the second exterior registration device VII, having a similarly sized chamfer portion (of 6 mm in the Z-direction and 3 mm in the Y-direction) but having smaller inner and outer diameters in comparison to, respectively, the inner and outer diameters of the second exterior registration device VII). Further, the second exterior slot registration device VII' may have a smaller length compared to the length of the second exterior slot registration device VII. An end portion 2148 may have a length that is less than the length of the end portion 1148, while the chamfered portion 2150 may have a similar length to the chamfered portion 1150 of about 6 mm.

The second exterior registration device VIII' may also similarly be sized smaller than the second exterior registration device VII. For example, while the second exterior registration device VII' may have a similarly sized chamfer potion 2154 (of about 6 mm in the Z-direction and about 1.5 mm in the Y-direction), the second exterior registration device VII' may have an outer diameter less than the outer diameter of the second exterior registration device VII and a total length less than the total length of the second exterior registration device VII.

Further, the caliper measuring device 1205 of FIG. 11 may additionally be used such that a measurement of the predetermined distance to define the center point 310, as described above, may be determined based on a summation of half the feature thickness 1200 of the extension rod receiving feature VI, the ring thickness 1202 of the auxiliary ring 1201, a second portion thickness of the second circumferential portion 2142 of the interior portion 2130 of the second slot registration device IX', and an adjustable spacing 1206 measurable by the caliper measuring device 1205 between facing ends of the auxiliary ring 1201 and the extension rod receiving feature VI'. For example, the adjustable spacing 1206 may be set such that the sum of the adjustable spacing 1206, half of the feature thickness 1200, the ring thickness 1202, and the second portion thickness equal the distance 314 at, for example, 48.4 mm.

As described in embodiments herein, bracket pocket dimensional verifier tools for vehicle suspension systems are able to manually determine, register, and verify center points of lower control arm bracket pockets on a vehicle frame in relation to other lower control arm bracket pockets in a much shorter timeframe than through use of automated CMM operations. Further, the manual tools described herein may measure dimensions between the registered center points of a set of bracket points to verify correct dimensional placement of the set of bracket pockets on the vehicle frame, or to determine an incorrect dimensional placement such that a quality control check fails and a vehicle frame error is determined for correction. Such a error may occur when the registered center points are measured and are not found to respectively be placed at certain predetermined distances from respective cam slots and/or are not found to form a rectangular shape with other registered center points, for example.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bracket pocket dimensional verifier tool for dimensional verification of a first lower control arm bracket pocket of a vehicle frame of a vehicle suspension system, the tool comprising:

a first end exterior sub-assembly for insertion through a first cam slot of the first lower control arm bracket pocket and adjustable to lock to a first bracket wall defining the first cam slot wherein the first end exterior sub-assembly comprises a first slot registration device, a first interior slot registration device, a first exterior registration device, a first interior lock nut, and a first exterior lock nut;

a second end exterior sub-assembly configured for insertion through a second cam slot of the first lower control arm bracket pocket and adjustable to lock to a second bracket wall defining the second cam slot; and an intermediate sub-assembly disposed between the first and second end exterior sub-assemblies and attachable to the first and second end exterior sub-assemblies via a shaft, the intermediate sub-assembly comprising an extension rod receiving feature defining at least one extension rod receiving aperture;

wherein the first end exterior sub-assembly, the second end exterior sub-assembly, and the intermediate sub-assembly lock against the first and second bracket walls to define a horizontal center axis and are adjustable to determine a center point along an intersecting vertical center axis between the first and second cam slots of the first lower control arm bracket pocket that is alignable with the at least one extension rod receiving aperture.

2. The tool of claim 1, wherein the at least one extension rod receiving aperture is alignable with the center point along the intersecting vertical center axis in a downward-facing direction.

3. The tool of claim 1, wherein:

the first slot registration device comprises a first threaded nut portion configured to extend through the first cam slot, an intermediate chamfered portion extending from an intermediate portion and configured to be gripped within the first bracket wall defining the first cam slot, and an interior threaded end including a first assembly blind bore configured to receive a first end of a projecting portion of a swivel part of the intermediate sub-assembly, the projecting portion is configured to receive the shaft;

the first interior slot registration device comprises a chamfered portion extending from an end portion defining an aperture that is configured to be disposed about the intermediate portion of the first slot registration device;

the first interior lock nut is configured to be disposed about and lockable against the interior threaded end of the first slot registration device; and the first exterior lock nut is configured to be disposed about and lockable against the first threaded nut portion.

4. The tool of claim 1, wherein the second end exterior sub-assembly comprises a slot registration device, an auxiliary ring, an exterior slot registration device, another exterior slot registration device, and an exterior lock nut.

5. The tool of claim 4, wherein:

the slot registration device comprises an interior portion including an end portion, an intermediate portion and a threaded end portion, the end portion defining a second assembly blind bore configured to receive a shaft end of the shaft, the end portion defining a first circumferential portion and a second circumferential portion separated by a ledge, the first circumferential portion having a first portion thickness and a first portion diameter, the second circumferential portion having a second portion thickness and a second portion diameter that is greater than the first portion diameter, the second circumferential portion configured to abut against an interior of the second bracket wall; and the auxiliary ring defines an aperture configured to be disposed about the first circumferential portion of the end portion of the slot registration device.

6. The tool of claim 5, wherein:

the exterior slot registration device comprises a chamfered portion extending from an end portion defining an aperture configured to be disposed about the intermediate portion of the slot registration device, the chamfered portion configured to be gripped within the second bracket wall defining the second cam slot;

the another exterior slot registration device comprises a chamfered portion extending from an end portion defining an aperture configured to be disposed about the end portion of the exterior slot registration device, the chamfered portion of the another exterior slot registration device configured to be gripped within the second bracket wall defining the second cam slot; and the exterior lock nut is configured to be disposed about and lockable against the threaded end portion of the slot registration device.

7. The tool of claim 5, further comprising a caliper measuring device, wherein:

the extension rod receiving feature comprises a feature length and a feature thickness;

the auxiliary ring of the second end exterior sub-assembly comprises a ring thickness and a ring length that is approximately equivalent to the feature length of the extension rod receiving feature;

a measurement of a predetermined distance is determined based on a summation of half the feature thickness of the extension rod receiving feature, the ring thickness of the auxiliary ring, the second portion thickness of the second circumferential portion of the end portion of the slot registration device, and an adjustable spacing measureable by the caliper measuring device between facing ends of the auxiliary ring and the extension rod receiving feature.

8. The tool of claim 1, wherein:

the intermediate sub-assembly further comprises:
a first intermediate lock nut;
a second intermediate lock nut;
an intermediate portion comprising:
a first end portion and a second end portion together defining a through bore configured to receive the shaft, and
a swivel part configured to account for an angle deviation of the center point from a longitudinal axis defined between respective centers of the first cam slot and the second cam slot respectively defined by the first and second bracket walls;
a threaded nut configured to be disposed about the second end portion;
an adjustable thread device configured to be disposed about the threaded nut; and
a pair of locking hex nuts;

the extension rod receiving feature is configured to be disposed about the adjustable thread device;

the second intermediate lock nut is configured to lock the extension rod receiving feature and the adjustable thread device;

the first intermediate lock nut is configured to lock the threaded nut and the intermediate portion; and the pair of locking hex nuts are configured to lock the shaft in place such that the attached first end exterior sub-assembly and intermediate sub-assembly are adjustable to be spaced and locked a predetermined distance away from the second end exterior sub-assembly.

9. A bracket pocket dimensional verifier tool for dimensional verification of a first lower control arm bracket pocket of a vehicle frame of a vehicle suspension system, the tool comprising:

a first end exterior sub-assembly configured for insertion through a first cam slot of the first lower control arm bracket pocket and adjustable to lock to a first bracket wall defining the first cam slot;

a second end exterior sub-assembly configured for insertion through a second cam slot of the first lower control arm bracket pocket and adjustable to lock to a second bracket wall defining the second cam slot, wherein the second end exterior sub-assembly comprises a slot registration device, an auxiliary ring, an exterior slot registration device, another exterior slot registration device, and an exterior lock nut; and an intermediate sub-assembly disposed between the first and second end exterior sub-assemblies and attachable to the first and second end exterior sub-assemblies via a shaft, the intermediate sub-assembly comprising an extension rod receiving feature defining at least one extension rod receiving aperture;

wherein the first end exterior sub-assembly, the second end exterior sub-assembly, and the intermediate sub-assembly lock against the first and second bracket walls to define a horizontal center axis and are adjustable to determine a center point along an intersecting vertical center axis between the first and second cam slots of the first lower control arm bracket pocket that is alignable with the at least one extension rod receiving aperture.

10. The tool of claim 9, wherein the at least one extension rod receiving aperture is alignable with the center point along the intersecting vertical center axis in a downward-facing direction.

11. The tool of claim 9, wherein:
the first end exterior sub-assembly comprises a first slot registration device, a first interior slot registration device, a first exterior registration device, a first interior lock nut, and a first exterior lock nut;
the first slot registration device comprises a first threaded nut portion configured to extend through the first cam slot, an intermediate chamfered portion extending from an intermediate portion and configured to be gripped within the first bracket wall defining the first cam slot, and an interior threaded end including a first assembly blind bore configured to receive a first end of a projecting portion of a swivel part of the intermediate sub-assembly, the projecting portion is configured to receive the shaft;
the first interior slot registration device comprises a chamfered portion extending from an end portion defining an aperture that is configured to be disposed about the intermediate portion of the first slot registration device;
the first interior lock nut is configured to be disposed about and lockable against the interior threaded end of the first slot registration device; and
the first exterior lock nut is configured to be disposed about and lockable against the first threaded nut portion.

12. The tool of claim 9, wherein:
the slot registration device comprises an interior portion including an end portion, an intermediate portion and a threaded end portion, the end portion defining a second assembly blind bore configured to receive a shaft end of the shaft, the end portion defining a first circumferential portion and a second circumferential portion separated by a ledge, the first circumferential portion having a first portion thickness and a first portion diameter, the second circumferential portion having a second portion thickness and a second portion diameter that is greater than the first portion diameter, the second circumferential portion configured to abut against an interior of the second bracket wall; and
the auxiliary ring defines an aperture configured to be disposed about the first circumferential portion of the end portion of the slot registration device.

13. The tool of claim 9, wherein:
the intermediate sub-assembly further comprises:
a first intermediate lock nut;
a second intermediate lock nut;
an intermediate portion comprising:
a first end portion and a second end portion together defining a through bore configured to receive the shaft, and
a swivel part configured to account for an angle deviation of the center point from a longitudinal axis defined between respective centers of the first cam slot and the second cam slot respectively defined by the first and second bracket walls;
a threaded nut configured to be disposed about the second end portion;
an adjustable thread device configured to be disposed about the threaded nut; and
a pair of locking hex nuts;
the extension rod receiving feature is configured to be disposed about the adjustable thread device;
the second intermediate lock nut is configured to lock the extension rod receiving feature and the adjustable thread device;
the first intermediate lock nut is configured to lock the threaded nut and the intermediate portion; and
the pair of locking hex nuts are configured to lock the shaft in place such that the attached first end exterior sub-assembly and intermediate sub-assembly are adjustable to be spaced and locked a predetermined distance away from the second end exterior sub-assembly.

14. A bracket pocket dimensional verifier tool for dimensional verification of a first lower control arm bracket pocket of a vehicle frame of a vehicle suspension system, the tool comprising:
a first end exterior sub-assembly including a first assembly blind bore and configured for insertion through a first cam slot of the first lower control arm bracket pocket and adjustable to lock to a first bracket wall defining the first cam slot;
a second end exterior sub-assembly configured for insertion through a second cam slot of the first lower control arm bracket pocket and adjustable to lock to a second bracket wall defining the second cam slot; and
an intermediate sub-assembly disposed between the first and second end exterior sub-assemblies and attachable to the first and second end exterior sub-assemblies via a shaft, the intermediate sub-assembly including a projecting portion attachable to the first end exterior sub-assembly through receipt into the first assembly blind bore, wherein a first end of the projecting portion is configured to abut against a blind end of the first assembly blind bore, the intermediate sub-assembly comprising an extension rod receiving feature defining at least one extension rod receiving aperture;
wherein the first end exterior sub-assembly, the second end exterior sub-assembly, and the intermediate sub-assembly lock against the first and second bracket walls to define a horizontal center axis and are adjustable to determine a center point along an intersecting vertical center axis between the first and second cam slots of the first lower control arm bracket pocket that is alignable with the at least one extension rod receiving aperture.

15. The tool of claim 14, wherein the at least one extension rod receiving aperture is alignable with the center point along the intersecting vertical center axis in a downward-facing direction.

16. The tool of claim 14, wherein the first end exterior sub-assembly comprises a first slot registration device, a first interior slot registration device, a first exterior registration device, a first interior lock nut, and a first exterior lock nut.

17. The tool of claim 16, wherein:
the first slot registration device comprises a first threaded nut portion configured to extend through the first cam slot, an intermediate chamfered portion extending from an intermediate portion and configured to be gripped within the first bracket wall defining the first cam slot, and an interior threaded end including the first assembly blind bore configured to receive the first end of the projecting portion of a swivel part of the intermediate sub-assembly, the projecting portion is configured to receive the shaft;
the first interior slot registration device comprises a chamfered portion extending from an end portion defining an aperture that is configured to be disposed about the intermediate portion of the first slot registration device;
the first interior lock nut is configured to be disposed about and lockable against the interior threaded end of the first slot registration device; and
the first exterior lock nut is configured to be disposed about and lockable against the first threaded nut portion.

18. The tool of claim 14, wherein the second end exterior sub-assembly comprises a slot registration device, an auxiliary ring, an exterior slot registration device, another exterior slot registration device, and an exterior lock nut.

19. The tool of claim 18, wherein:
the slot registration device comprises an interior portion including an end portion, an intermediate portion and a threaded end portion, the end portion defining a second assembly blind bore configured to receive a shaft end of the shaft, the end portion defining a first circumferential portion and a second circumferential portion separated by a ledge, the first circumferential portion having a first portion thickness and a first portion diameter, the second circumferential portion having a second portion thickness and a second portion diameter that is greater than the first portion diameter, the second circumferential portion configured to abut against an interior of the second bracket wall; and
the auxiliary ring defines an aperture configured to be disposed about the first circumferential portion of the end portion of the slot registration device.

* * * * *

UNITED STATES PATENT AND TRADEMARK OFFICE
CERTIFICATE OF CORRECTION

PATENT NO. : 10,365,185 B2  
APPLICATION NO. : 15/151969  
DATED : July 30, 2019  
INVENTOR(S) : Christopher T. Clark Page 1 of 1

It is certified that error appears in the above-identified patent and that said Letters Patent is hereby corrected as shown below:

On the Title Page

Item (56), References Cited, Other Publications, delete:
"Faro offers the world's best-selling measurement arm;
http://www.fara.com/products/metrology/faroarm-measuring-arm/overview"
And insert:
--Faro offers the world's best-selling measurement arm;
http://www.faro.com/products/metrology/faroarm-measuring-arm/overview--, therefor.

In the Claims

In Column 18, Claim 1, Line 56, after "cam slot" insert --,--.

Signed and Sealed this
Twenty-ninth Day of October, 2019

Andrei Iancu
*Director of the United States Patent and Trademark Office*